(No Model.)
H. S. G. RAY.
SASH FASTENER.
No. 573,295. Patented Dec. 15, 1896.
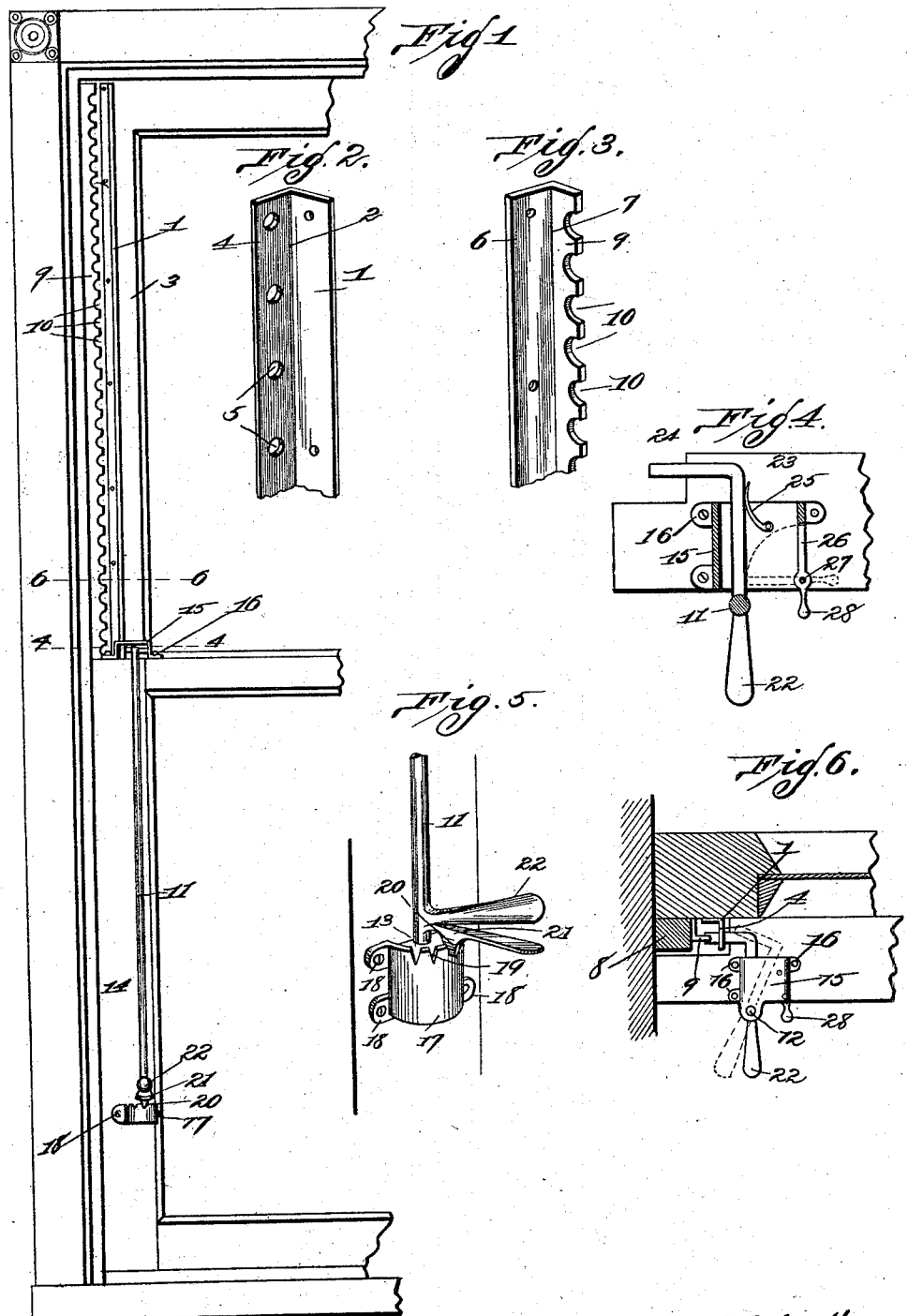
Inventor
Henry S. G. Ray
By Higdon & Higdon & Longan
Attys.
Attest
J. K. Smith
J. G. Wells

UNITED STATES PATENT OFFICE.

HENRY S. G. RAY, OF LOUISIANA, MISSOURI.

SASH-FASTENER.

SPECIFICATION forming part of Letters Patent No. 573,295, dated December 15, 1896.

Application filed June 1, 1896. Serial No. 593,816. (No model.)

*To all whom it may concern:*

Be it known that I, HENRY S. G. RAY, of the city of Louisiana, Pike county, State of Missouri, have invented certain new and useful Improvements in Sash-Fasteners, of which the following is a full, clear, and exact description, reference being had to the accompanying drawings, forming a part hereof.

My invention relates to sash-fasteners and window-lifts; and it consists in the novel construction, combination, and arrangement of parts hereinafter shown, described, and claimed.

Figure 1 is a front elevation of one side of a window, showing the application of my combined sash-fastener and window-lift. Fig. 2 is an enlarged detail view of a piece of perforated angle-iron of which I make use. Fig. 3 is an enlarged detail view of a piece of notched angle-iron of which I make use. Fig. 4 is a horizontal sectional view on the line 4 4 of Fig. 1. Fig. 5 is an enlarged detail perspective of the means of locking the mechanism in a desired position. Fig. 6 is a horizontal sectional view on the line 6 6 of Fig. 1.

In the construction of my combined sash-fastener and window-lift the flange 1 of the angle-bar 2 is placed against the side bar 3 of the upper window-sash and secured thereto in a line parallel with the vertical line of said side bar. The flange 4 of said angle-bar has the series of perforations 5, thus forming a rack.

The flange 6 of the angle-bar 7 is attached to the inner face of the stile 8 of the window and adjacent to the flange 1. The flange 9 of this angle-bar has the series of notches 10 in its outer edge, thus forming a rack, said notches being adjacent to and in line with the perforations 5 of the flange 4.

The rod 11 is mounted in the bearings 12 and 13 upon and in vertical alinement with the side bar 14 of the lower window-sash. The bearing 12 is attached to the plate 15, which is in the form of a channel-bar and has ears 16 projecting outwardly from its edges, by means of which ears it is attached to the upper side of the upper cross-bar of the lower window-sash.

A semicircular plate 17 surrounds the bearing 13 on the side opposite the side bar 14 and is attached to said side bar by means of the ears 18. In the upper edge of the plate 17 are notches 19, which notches are engaged by the pawl 20, attached to the lower face of the spring-arm 21, which spring-arm is attached at its inner end to the lower end of the rod 11. The handle 22 is attached to said rod 11 immediately above the spring-arm 21. Projecting inwardly at right angles to the rod 11 and at the upper end thereof and immediately below the bearing 12 is an arm 23, the inner end 24 of which is bent toward the side of the window in a horizontal line. The arm 23 operates within the channel of the plate 15, and a spring 25 operates against the side of said arm 23 opposite the outwardly-turned end 24. A dog 26 is pivotally mounted upon the pin 27 at the inner front corner of the plate 15, and a handle 28 is attached to said dog for operating the same. When the dog is in the position shown in full lines in Fig. 4, the arm 23 is free to operate, but when by operating the handle 28 the dog 26 is turned into the position as shown in dotted lines in Fig. 4 the sash-fastener mechanism is securely locked.

In the practical operation of my improved sash-fastener and window-lift the rod 11 is operated by means of the handle 22 and is held in the desired position by means of the pawl 20, engaging the notches 19. The end 24 of the arm 23 operates in the apertures 5 in the flange 4 the rack attached to the side rail of the upper sash, and then in the notches 10 in the flange 9 the rack attached to the stile of the window-frame. The said end 24, being rigidly connected to the rod 11, is operated by the handle 22 and is held in position by the pawl 20. By operating the handle 22 so that the end 24 passes out of the apertures 10, as shown in dotted lines in Fig. 6, the two sashes of the window are disconnected. The lower sash may then be moved up or down, as required, to adjust the sashes relative to each other by means of the handle 22. Then by operating the pawl 20 and turning the rod 11 the end 24 passes through the apertures 5 in the flange 4 and locks the two sashes of the window together. Then said sashes may be operated jointly to any desired position within the window, and by again operating the pawl 20 and turning the rod 11 still farther the end 24 upon the arm 23 will pass into and engage the notches 10 on the flange 9, and thus lock the two sashes in the desired position in the window. The handle 28 may then be operated to bring the free end of the dog 26 against the rear or inner side of the arm 23, as shown in dotted lines in Fig. 4, and the parts are securely locked in position.

When it is desired to close and lock the window, the sashes are moved to their normal position and the handle 22 is operated to pass the end 24 through the lower one of the apertures 5 and then into the lower one of the notches 10, and the handle 28 is operated to bring the free end of the dog 26 against the arm 23. While in this position neither of the sashes of the window can be moved from the outside.

When the pawl 20 is disengaged from the notches 19, the spring 25 operates to cause the end 24 of the arm 23 to enter the apertures 5 in the flange 4 and to engage the notches 10 in the flange 9.

For use on heavy windows the devices are made in rights and lefts and one is placed on each side of the window.

My improved sash-fastener and window-lift is very simple, cheap, and efficient, and possesses many advantages over anything heretofore in use for that purpose.

I claim—

1. In a device of the class described, a rack attached to the upper sash, a rack attached to the window-frame, a pin carried by the lower sash, a rod attached to said pin, a pawl attached to said rod and a rack to be engaged by said pawl, substantially as specified.

2. In a device of the class described, a rack attached to the upper sash, a rack attached to the window-frame in such a position that the openings in said racks are in alinement, a pin carried by the lower sash and in position to have its free end engage the openings in said racks as desired, a rod attached to said pin for operating the same, a pawl attached to said rod for controlling the operation of the same, a rack to be engaged by said pawl, and a dog pivotally mounted upon said lower sash and in position to have its free end engage said pin as required to lock said pin in position in engagement with said racks, substantially as specified.

In testimony whereof I affix my signature in presence of two witnesses.

HENRY S. G. RAY.

Witnesses:
MAUD GRIFFIN,
S. G. WELLS.